(12) United States Patent
Yoshioka et al.

(10) Patent No.: US 12,474,512 B2
(45) Date of Patent: Nov. 18, 2025

(54) OPTICAL FILTER, IR SENSOR, AND LIGHT EMITTING DEVICE

(71) Applicant: Panasonic Intellectual Property Management Co., Ltd., Osaka (JP)

(72) Inventors: Tatsuro Yoshioka, Osaka (JP); Natsuki Sato, Osaka (JP); Naoki Kurizoe, Osaka (JP); Ryosuke Sawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 325 days.

(21) Appl. No.: 18/275,899

(22) PCT Filed: Feb. 10, 2022

(86) PCT No.: PCT/JP2022/005316
§ 371 (c)(1),
(2) Date: Aug. 4, 2023

(87) PCT Pub. No.: WO2022/176769
PCT Pub. Date: Aug. 25, 2022

(65) Prior Publication Data
US 2024/0118470 A1    Apr. 11, 2024

(30) Foreign Application Priority Data
Feb. 19, 2021   (JP) ................. 2021-025009

(51) Int. Cl.
*G02B 5/20*           (2006.01)
(52) U.S. Cl.
CPC ............. *G02B 5/208* (2013.01); *G02B 5/206* (2013.01)

(58) Field of Classification Search
CPC ............... G02B 5/206; G02B 5/208; G02B 5/22–5/223; C04B 35/00–35/83
See application file for complete search history.

(56) References Cited

U.S. PATENT DOCUMENTS

2022/0185737 A1    6/2022   Sato et al.

FOREIGN PATENT DOCUMENTS

| GB | 1320357 A | * 6/1973 | ............. G02B 5/206 |
|---|---|---|---|
| JP | 63-073203 A | 4/1988 | |

(Continued)

OTHER PUBLICATIONS

International Search Report for corresponding Application No. PCT/JP2022/005316, mailed Apr. 19, 2022.

(Continued)

*Primary Examiner* — Prashant J Khatri
(74) *Attorney, Agent, or Firm* — Renner, Otto, Boisselle & Sklar, LLP

(57) ABSTRACT

Provided is an optical filter including: a matrix including an inorganic substance having a water solubility of 0.4 g/100 g-$H_2O$ or less; and a wavelength selective absorption material dispersed in the matrix. The optical filter absorbs an optical component having a wavelength of any band in a target wavelength band of 0.8 to 20 μm. A temperature at which a mass reduction rate of the wavelength selective absorption material is 10% by mass when heated in air from 100° C. at a rate of 10° C./min is 900° C. or less. An apparent density of the optical filter relative to a true density of the matrix is 70% or more. In the target wavelength band, a wavelength bandwidth where a linear transmittance per 1 mm thickness of the optical filter is 30% or more is 50 nm or more.

12 Claims, 9 Drawing Sheets

(56) References Cited

FOREIGN PATENT DOCUMENTS

| | | |
|---|---|---|
| JP | 2004-240289 A | 8/2004 |
| JP | 2015-196622 A | 11/2015 |
| WO | 2020/195183 A1 | 10/2020 |

OTHER PUBLICATIONS

Written Opinion for corresponding Application No. PCT/JP2022/005316, mailed Apr. 19, 2022.

* cited by examiner

OPTICAL FILTER, IR SENSOR, AND LIGHT EMITTING DEVICE

TECHNICAL FIELD

The present invention relates to an optical filter, an infrared sensor, and a light emitting device.

BACKGROUND ART

Infrared sensors are conventionally used, for example, in flame sensors or human sensors. Such infrared sensors receive infrared rays having a specific wavelength emitted from a flame, a person, or the like to detect the presence of the flame or the person. However, infrared sensors also detect light components emitted from objects other than the detection object described above and having different wavelengths from that of the detection object. Therefore, in order to remove light components causing noise, these infrared sensors use an optical filter that selectively transmits only infrared rays having a specific wavelength.

As such an optical filter, Patent Literature 1 discloses a particle-dispersed composite infrared band-pass filter that includes a resin and inorganic compound particles uniformly dispersed in the resin and selectively transmitting only a specific wavelength band with respect to infrared rays.

CITATION LIST

Patent Literature

Patent Literature 1: Japanese Unexamined Patent Application Publication No. 63-073203

SUMMARY OF THE INVENTION

The related art features the easy production of band-pass filters having a wide selection range of transmission wavelength bands by selecting a combination of a resin and inorganic compound particles. However, resins are known to deteriorate due to exposure to ultraviolet light. Therefore, with conventional band-pass filters, the optical properties may change with the passage of time, and this may limit the place of use.

The present invention has been made in consideration of the above issue, which is inherent in the related art. An object of the present invention is to provide an optical filter, an infrared sensor, and a light emitting device that include a matrix made from an inorganic substance and have excellent durability.

In response to the above issue, an optical filter according to a first aspect of the present invention includes a matrix including an inorganic substance having a water solubility of 0.4 g/100 g-$H_2O$ or less, and a wavelength selective absorption material dispersed in the matrix. The optical filter absorbs an optical component having a wavelength of any band in a target wavelength band of 0.8 to 20 μm. A temperature at which a mass reduction rate of the wavelength selective absorption material is 10% by mass when heated in air from 100° C. at a rate of 10° C./min is 900° C. or less. An apparent density of the optical filter relative to a true density of the matrix is 70% or more. In the target wavelength band, a wavelength bandwidth where a linear transmittance per 1 mm thickness of the optical filter is 30% or more is 50 nm or more.

An infrared sensor according to a second aspect of the present invention includes the optical filter described above.

A light emitting device according to a third aspect of the present invention includes the optical filter described above.

DETAILED DESCRIPTION OF THE INVENTION

Figure 1:
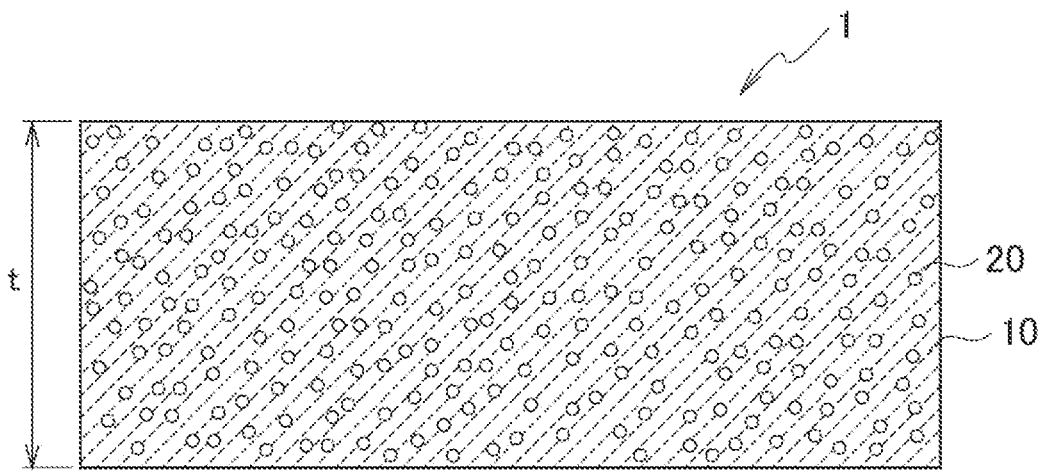
FIG. 1 is a schematic cross-sectional view of an example of an optical filter according to the present embodiment.

Referring to the drawings, a detailed description is given below of an optical filter, an infrared sensor, a light emitting device, and a method for manufacturing the optical filter according to a present embodiment. Note that dimensional ratios in the drawings are exaggerated for convenience of the description and are sometimes different from actual ratios.

[Optical Filter]

As illustrated in FIG. 1, an optical filter 1 according to the present embodiment includes a matrix 10 and a wavelength selective absorption material 20.

The matrix 10 is made from an inorganic substance. Thus, compared with the case where a resin is used, the matrix 10 is less likely to deteriorate over time, and the optical filter 1 can be obtained having high transmission of infrared rays.

The inorganic substance making up the matrix 10 has water solubility of 0.4 (g/100 g-$H_2O$) or less. When the solubility of the inorganic substance in water is the above-described value or less, the optical filter 1 can be used stably even in a high-humidity environment or an underwater environment. Note that the solubility was measured at 1 atm and 25° C. The unit of solubility "g/100 g-$H_2O$" means the mass of the inorganic substance dissolved in 100 g of water.

The inorganic substance making up the matrix 10 contains at least one metallic element selected from the group consisting of an alkali metal, an alkaline earth metal, a transition metal, a base metal, and a semimetal. In this specification, the alkaline earth metal includes beryllium and magnesium in addition to calcium, strontium, barium, and radium. The base metal includes aluminum, zinc, gallium, cadmium, indium, tin, mercury, thallium, lead, bismuth, and polonium. The semimetal includes boron, silicon, germanium, arsenic, antimony, and tellurium. Among them, the inorganic substance preferably contains at least one metallic element selected from the group consisting of an alkali metal such as lithium, zinc, aluminum, and magnesium. For the inorganic substance containing a metallic element described above, it becomes possible to easily form a binding part 12 derived from the inorganic substance using a pressure heating method as described below.

The inorganic substance making up the matrix 10 preferably contains, for example, at least one compound selected from the group consisting of a fluoride, an oxide, a nitride, a hydroxide, an oxidized hydroxide, a sulfide, a boride, a carbide, and a halide of a metallic element described above. The inorganic substance more preferably contains a compound described above as a main component. Note that the main component means that the inorganic substance contains 50 mol % or more of a compound described above. The inorganic substance preferably contains 80 mol % or more, more preferably 90 mol % or more of a compound described above. Note that the oxide of a metallic element described above may contain a phosphate, a silicate, an aluminate, and a borate in addition to a compound in which only oxygen is bound to the metallic element. The inorganic substance making up the matrix 10 may be a complex anionic compound containing a metallic element described above. The complex anionic compound is a substance containing multiple anions in a single compound, and examples thereof include an acid fluoride, an acid chloride, and an oxynitride.

Note that it is preferable that the inorganic substance making up the matrix 10 contain at least one selected from the group consisting of a fluoride, an oxide, and an oxidized hydroxide. Since such an inorganic substance has low water solubility, the optical filter 1 can be used stably even in a high-humidity environment or an underwater environment. Examples of the fluoride include magnesium fluoride and lithium fluoride. For example, when the inorganic substance contains lithium fluoride, the optical filter 1 can be provided having high light transmission in a wavelength band of 10 μm or less and having high density. Examples of the oxide include aluminum oxide, zinc oxide, magnesium oxide, cerium oxide, and yttrium oxide.

Figure 2:
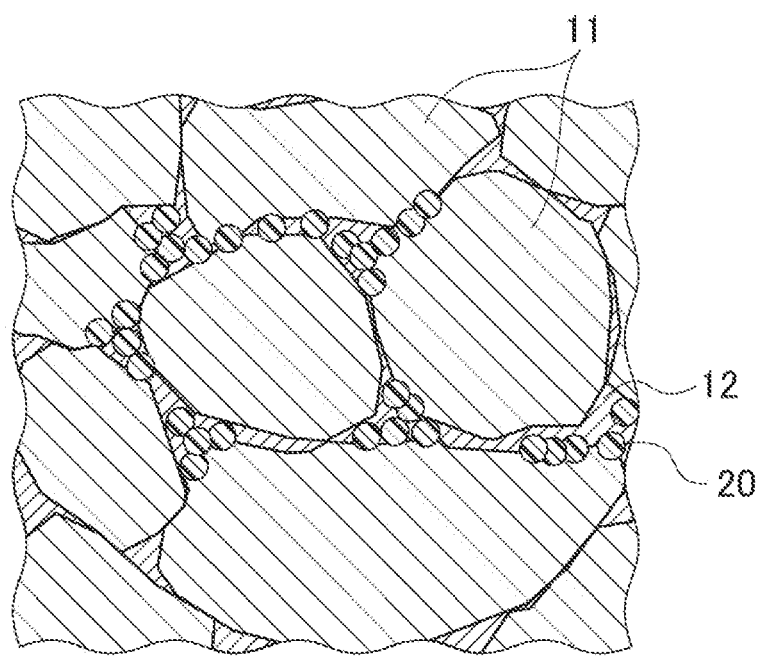
FIG. 2 is an enlarged cross-sectional view of the optical filter in FIG. 1.

As illustrated in FIG. 2, the matrix 10 may contain multiple inorganic particles 11. Each of the multiple inorganic particles 11 is bound to each other. The inorganic particles 11 may be in point contact with each other or may be in surface contact in which surfaces of the inorganic particles 11 contact each other. The matrix 10 may also include a binding part 12 binding the multiple inorganic particles 11 to each other. Adjacent inorganic particles 11 are bound through the binding part 12 and thus the inorganic particles 11 are three-dimensionally bound to each other, and then the optical filter 1 can be obtained having a high mechanical strength. The binding part 12 is preferably in direct contact with the inorganic particles 11. Also, the binding part 12 preferably covers at least part of the surface of each of the inorganic particles 11, more preferably the entire surface of each of the inorganic particles 11. Hence, the inorganic particles 11 and the binding part 12 are tightly bound to each other, and thus the optical filter 1 can be obtained having excellent density and excellent mechanical strength. The binding part 12 may be present between the inorganic particles 11 and the wavelength selective absorption material 20, and among adjacent particles of the wavelength selective absorption material 20, in addition to among adjacent inorganic particles 11.

The inorganic particles 11 may be made from an inorganic substance similar to the inorganic substance making up the matrix 10 as described above.

The inorganic substance making up the inorganic particles 11 may be crystalline or amorphous. The inorganic substance making up the inorganic particles 11 is preferably crystalline from the viewpoint of the gas barrier property or durability. The inorganic substance making up the inorganic particles 11 is preferably amorphous from the viewpoint of light transmittance. Note that when the inorganic substance is crystalline, the inorganic particles 11 are more preferably crystalline inorganic particles containing at least one metallic element selected from the group consisting of an alkali metal, an alkaline earth metal, a transition metal, a base metal, and a semimetal.

The inorganic particles 11 are preferably crystalline particles containing at least one selected from the group consisting of an oxide, a nitride, a hydroxide, an oxidized hydroxide, a sulfide, a boride, a carbide, and a halide of a metallic element described above from the viewpoint of the gas barrier property or durability. The inorganic particles 11 are more preferably crystalline inorganic particles containing, as a main component, at least one selected from the group consisting of an oxide, a nitride, a hydroxide, an oxidized hydroxide, a sulfide, a boride, a carbide, and a halide of a metallic element described above. The inorganic particles 11 preferably contain 80 mol % or more, more preferably 90 mol % or more, and more preferably 95 mol % or more of at least one selected from the group consisting of an oxide, a nitride, a hydroxide, an oxidized hydroxide, a sulfide, a boride, a carbide, and a halide of a metallic element described above. Note that the inorganic substance may be single crystal or polycrystalline.

The average particle size of the multiple inorganic particles 11 is preferably 50 nm or more and 50 μm or less. When the average particle size of the inorganic particles 11 is 50 μm or less, the light transmittance of the optical filter 1 becomes higher. When the average particle size of the inorganic particles 11 is within this range, the inorganic particles 11 are tightly bound to each other, and the strength of the optical filter 1 can be enhanced. When the average particle size of the inorganic particles 11 is within this range, the proportion of pores present inside the optical filter 1 is 30% or less, as described below, and thus it becomes possible to enhance the strength of the optical filter 1. From the viewpoint of improving the light transmittance of the optical filter 1, the average particle size of the multiple inorganic particles 11 is more preferably 30 μm or less, even more preferably 20 μm or less, particularly preferably 10 μm or less. Note that as for the value of the "average particle size" in this specification, unless otherwise noted, an adopted value is calculated as the average of the particle sizes of particles observed in several to several dozen fields of view using an observation means such as a scanning electron microscope (SEM) or a transmission electron microscope (TEM).

The shape of the inorganic particles 11 is not particularly limited and can be spherical, for example. The inorganic particles 11 may have a whisker shape (needle shape) or a scale shape. Particles having a whisker shape or a scale shape have a higher degree of contact with other particles compared to the particles having a spherical shape, and this makes it possible to increase the strength of the entire optical filter 1.

The binding part 12 preferably contains an amorphous inorganic compound. Specifically, the binding part 12 may be made of only an amorphous inorganic compound or be a mixture of amorphous and crystalline inorganic compounds. The binding part 12 may be a part in which a crystalline inorganic compound is dispersed inside an amorphous inorganic compound. When amorphous and crystalline inorganic compounds are mixed, the amorphous inorganic compound and the crystalline inorganic compound may have the same chemical composition or different chemical compositions from each other.

It is preferable that the inorganic particles 11 and the binding part 12 contain the same metallic element and that the metallic element be at least one selected from the group consisting of an alkali metal, an alkaline earth metal, a transition metal, a base metal, and a semimetal. That is, the inorganic compound making up the inorganic particles 11 and the amorphous inorganic compound making up the binding part 12 preferably contain at least the same metallic element. The inorganic compound making up the inorganic particles 11 and the amorphous inorganic compound making up the binding part 12 may have the same chemical composition or different chemical compositions from each other.

The wavelength selective absorption material 20 is dispersed in the matrix 10. The wavelength selective absorption material 20 may be present among adjacent inorganic particles 11 or in the binding part 12. Since the wavelength selective absorption material 20 is dispersed in the matrix 10, the optical filter 1 can be obtained having low dependency on the incident angle of light and having high light transmission even when the incident angle is large. That is, even when the optical filter 1 is irradiated with light from an oblique direction, the optical filter 1 can absorb a specific light component and transmit other light components. Since the inorganic substance making up the matrix 10 has a higher gas barrier property than resins, the oxidation of the wavelength selective absorption material 20 can be suppressed by dispersing the wavelength selective absorption material 20 in the matrix 10. Thus, materials such as an oxidizing agent and a reducing agent that are unstable in air can also be used as the wavelength selective absorption material 20.

Note that in the case of interference filters in which a multilayer film including a stack of multiple dielectrics having different refractive indices is provided on the surface of a substrate, it is recommended to transmit light in a direction perpendicular to the incident surface of the interference filter because the transmission wavelength may change depending on the angle at which the light enters. In contrast, in the optical filter 1 according to the present embodiment, the wavelength selective absorption material 20 is dispersed in the matrix 10. Thus, the transmission wavelength is less dependent on the incident angle, and even when light is emitted from an oblique direction to the surface of the optical filter 1, the effect on the transmission wavelength is small. Therefore, there is a possibility that the optical filter 1 according to the present embodiment can be deployed in applications where interference filters could not be used.

In color glass filters, an absorbent that absorbs a light component having a specific wavelength is dispersed in glass, and thus the transmission wavelength is less dependent on the incident angle. However, in these color glass filters, the forming temperature for dispersing glass in the absorbent is high. Thus, only materials that can withstand such a forming temperature can be adopted, and the degree of design freedom is low. In contrast, the optical filter 1 according to the present embodiment can be manufactured at a low temperature because the wavelength selective absorption material 20 can be dispersed in the matrix 10 using a pressure heating method as described below.

The temperature at which the mass reduction rate of the wavelength selective absorption material 20 is 10% by mass when heated from 100° C. at a rate of 10° C./min in air is within a range of 900° C. or less. Since the optical filter 1 can be manufactured at a low temperature, the wavelength selective absorption material 20 can be dispersed in the matrix 10 even when the wavelength selective absorption material 20 is a compound having a low heat resistance or is a material unstable in air, such as an oxidizing agent or a reducing agent. The temperature at which the mass reduction rate is 10% by mass may be 600° C. or less, or may be 300° C. or less. The temperature at which the mass reduction rate is 10% by mass may be 100° C. or more. Note that the mass reduction rate can be measured using TG (thermogravimetry).

The wavelength selective absorption material 20 may absorb a light component having a wavelength of any band in a target wavelength band of 0.8 to 20 μm. When the wavelength selective absorption material 20 absorbs such a light component, it is possible to remove light components that cause noise when the optical filter 1 is used for an infrared sensor, for example. Note that the target wavelength band may be 1 μm or more, 2 μm or more, 3 μm or more, 7 μm or more, or 8 μm or more. The target wavelength band may be 15 μm or less, 10 μm or less, or 6 μm or less.

The wavelength selective absorption material 20 may contain at least one selected from the group consisting of an inorganic compound, an organic compound, and a deuterium substitution in which hydrogen possessed by the inorganic compound or the organic compound is replaced with deuterium. The inorganic compound may contain at least one selected from the group consisting of a hydroxide, a nitrate, a sulfate, a hypophosphite such as calcium hypophosphite, and boric acid. The organic compound may contain at least one selected from the group consisting of a fluoropolymer, an azo-based metal complex, a triarylmethane-based compound, a cyanine-based compound, a squarylium-based compound, a phthalocyanine-based compound, a dithiolate-complex-based dye, a diimmonium-based compound, a naphthoquinone-based compound, an anthraquinone-based compound, and an amino compound such as melamine. The fluoropolymer may contain at least one selected from the group consisting of polytetrafluoroethylene (PTFE), polychlorotrifluoroethylene (PCTFE), polyvinylidene fluoride (PVDF), polyvinyl fluoride (PVF), perfluoroalkoxyfluoropolymer (PFA), tetrafluoroethylene-hexafluoropropylene copolymer (FEP), ethylene-tetrafluoroethylene copolymer (ETFE), and ethylene-chlorotrifluoroethylene copolymer (ECTFE). The fluoropolymer may be polyvinylidene fluoride (PVDF) or polytetrafluoroethylene (PTFE). These fluoropolymers are widely used and are readily available.

The average particle size of the wavelength selective absorption material 20 may be 500 nm or less. When the average particle size of the wavelength selective absorption material 20 is 500 nm or less, light scattering can be suppressed. The lower limit of the average particle size of the wavelength selective absorption material 20 is not particularly limited, and the average particle size of the wavelength selective absorption material 20 may be 1 nm or more. The average particle size of the wavelength selective absorption material 20 may be 10 nm or more, or 100 nm or more. The average particle size of the wavelength selective absorption material 20 may be 400 nm or less, or 300 nm or less.

The refractive index difference between a material making up the matrix 10 and a material making up the wavelength selective absorption material 20 may be 0.1 or less. When the refractive index difference is 0.1 or less, light scattering can be suppressed. The lower limit of the refractive index difference is not particularly limited, and it is sufficient that the refractive index difference be 0 or more. The refractive index difference may be 0.01 or more, or 0.02 or more. The refractive index difference may be 0.08 or less, or 0.04 or less.

The apparent density (hereinafter also referred to as "relative density") of the optical filter 1 relative to the true density of the matrix 10 is 70% or more. When the relative density is 70% or more, the optical filter 1 becomes dense and the amount of light transmitted through the optical filter 1 increases. When the relative density is 70% or more, the optical filter 1 becomes dense and the strength increases. Therefore, it becomes possible to improve the machinability of the optical filter 1. The generation of cracks originating from pores is suppressed in the optical filter 1, and thus it becomes possible to enhance the bending strength of the optical filter 1. The relative density of the optical filter 1 is more preferably 80% or more, even more preferably 90% or more, particularly preferably 95% or more.

The porosity in a cross section of the optical filter 1 is preferably 30% or less. That is, when the cross section of the optical filter 1 is observed, the average value of the percentage of pores per unit area is preferably 30% or less. When the porosity is 30% or less, the amount of light transmitted through the optical filter 1 increases. When the porosity is 30% or less, the optical filter 1 becomes dense and the strength increases. Therefore, it becomes possible to improve the machinability of the optical filter 1. When the porosity is 30% or less, generation of cracks originating from pores is suppressed in the optical filter 1, and thus it becomes possible to enhance the bending strength of the optical filter 1. Note that the porosity in the cross section of the optical filter 1 is more preferably 20% or less, even more preferably 10% or less, particularly preferably 5% or less. The lower that the porosity is in the cross section of the optical filter 1, the more that cracks originating from pores are suppressed, and it becomes possible to increase the strength of the optical filter 1.

In this specification, the porosity can be determined as follows. First, a cross section of the optical filter 1 is observed to discriminate between the matrix 10 and pores. Then, the unit area and the area of the pores in that unit area are measured to obtain the percentage of the pores per unit area, and the value is defined as the porosity. Note that it is more preferable to obtain the percentage of pores per unit area at multiple points in a cross section of the optical filter 1 and then to define the average value of the percentage of the pores per unit area as the porosity. When a cross section of the optical filter 1 is observed, an optical microscope, a scanning electron microscope (SEM), and a transmission electron microscope (TEM) can be used. The unit area and the area of pores in that unit area may be measured through binarizing an image observed using a microscope.

The size of pores inside the optical filter 1 is not particularly limited but is preferably as small as possible. When the size of pores is small, cracks originating from pores are suppressed, and this makes it possible to increase the strength of the optical filter 1 and to improve the machinability of the optical filter 1. When the size of pores is small, light scattering is suppressed, and thus the transmittance can be increased. Note that the size of pores in the optical filter 1 is preferably 5 µm or less, more preferably 1 µm or less, even more preferably 100 nm or less. The size of pores inside the optical filter 1 can be determined by observing a cross section of the optical filter 1 using a microscope in the same manner as the porosity described above.

In the optical filter 1, the volume percentage of the multiple inorganic particles 11 is preferably 30% or more. Here, the obtained optical filter 1 becomes a structure with which the properties of the inorganic particles 11 are easily utilized. In the optical filter 1, the volume percentage of the multiple inorganic particles 11 is more preferably 40% or more, even more preferably 50% or more. The volume percentage of the inorganic particles 11 is preferably larger than the volume percentage of the binding part 12.

Although dependent on the transmission properties of the optical filter 1, the volume percentage of the wavelength selective absorption material 20 in the optical filter 1 is preferably 0.1% by volume or more and 30% by volume or less. When the volume percentage of the wavelength selective absorption material 20 is 0.1% by volume or more, the amount of light absorbed by the optical filter 1 can be improved. When the volume percentage of the wavelength selective absorption material 20 is 30% by volume or less, the mechanical properties of the optical filter 1 can be improved. The volume percentage of the wavelength selective absorption material 20 is more preferably 0.2% by volume or more, even more preferably 0.5% by volume or more. The volume percentage of the wavelength selective absorption material 20 is more preferably 15% by volume or less, even more preferably 10% by volume or less, particularly preferably 5% by volume or less.

The optical filter 1 absorbs an optical component having a wavelength of any band in a target wavelength band of 0.8 to 20 µm. Since the optical filter 1 absorbs such an optical component, the optical filter 1 can remove optical components that become noise when the optical filter 1 is used for a sensor, for example. Note that the target wavelength band may be 1 µm or more, 2 µm or more, or 3 µm or more. The target wavelength band may be 15 µm or less, 10 µm or less, or 6 µm or less.

In the target wavelength band of 0.8 to 20 µm, the wavelength bandwidth where the linear transmittance per 1 mm thickness of the optical filter 1 is 30% or more is 50 nm or more. When the optical filter 1 has such a property, part of the optical components can be transmitted while part of the optical components is cut out in the target wavelength band. Thus, when the optical filter 1 is used for, for example, an infrared sensor, the optical filter 1 can remove optical components that become noise, and allow an optical component to be detected to reach the infrared sensor. Thus, an infrared sensor having low noise and high sensitivity can be obtained. Note that the wavelength bandwidth where the linear transmittance becomes 30% or more may be 100 nm or more, 300 nm or more, or 500 nm or more. The wavelength bandwidth where the linear transmittance becomes 30% or more may be 5,000 nm or less, 3,000 nm or less, or 1,000 nm or less. The linear transmittance may be 35% or more, or 40% or more. The upper limit of the linear transmittance is not particularly limited and may be 100%, for example.

In the target wavelength band of 0.8 to 20 µm, the wavelength bandwidth where the linear transmittance per 1 mm thickness of the optical filter 1 is 1% or less is preferably 50 nm or more. When the optical filter 1 has such a property and the optical filter 1 is used for an infrared sensor, for example, it is possible to greatly reduce optical components that become noise. Thus, an infrared sensor having low noise and high sensitivity can be obtained. Note that the wavelength bandwidth where the linear transmittance becomes 1% or less may be 100 nm or more, 300 nm or more, or 500 nm or more. The wavelength bandwidth where the linear transmittance becomes 1% or less may be 10,000 nm or less, 5,000 nm or less, 3,000 nm or less, or 1,000 nm or less. The linear transmittance may be 0.5% or less, or 0.2% or less. The lower limit of the linear transmittance is not particularly limited and may be 0%, for example.

Specifically, in the target wavelength band of 3 to 10 μm, the wavelength bandwidth where the linear transmittance is 30% or more is preferably 300 nm or more. In the target wavelength band of 3 to 10 μm, the wavelength bandwidth where the linear transmittance is 1% or less is preferably 300 nm or more. It is also preferable that in the target wavelength band of 3 to 10 μm, the wavelength bandwidth where the linear transmittance is 30% or more be 300 nm or more, and the wavelength bandwidth where the linear transmittance is 1% or less be 300 nm or more. The optical filter 1 described above is useful as a band-pass filter or a band-cut filter.

In the optical filter 1, the linear transmittance in the entire wavelength band of 8 to 20 μm may be 10% or less. Such an optical filter 1 can be used as a filter to cut wavelengths in the long wavelength band. Such a filter can reduce noise in the long wavelength region and thus can suppress erroneous detection when used in infrared sensors, for example. In addition, by cutting such a wide wavelength band, it is possible to increase the degree of freedom in designing devices such as infrared sensors. The linear transmittance in the entire wavelength band of 8 to 20 μm may be 8% or less, 5% or less, 2% or less, or 1% or less.

In the optical filter 1, the linear transmittance in the entire wavelength band of 7 to 20 μm may be 10% or less. Thus, the optical filter 1 can be provided further cutting the wavelength in the long wavelength band as described above. The linear transmittance in the entire wavelength band of 7 to 20 μm may be 9% or less, 6% or less, 4% or less, or 1% or less.

The inorganic substance may contain a fluoride, and the wavelength selective absorption material 20 may contain a fluoropolymer. Thus, the optical filter 1 can be provided cutting the wavelength in the long wavelength band as described above, for example. A fluoropolymer has a C—F bond and absorbs light in a wavelength band of 8 to 9 μm, and thus by combining it with the matrix 10 of a fluoride, the optical filter 1 can be provided cutting a specific wavelength in the long wavelength band as described above, for example. As the fluoride, those described above can be used, and for example, lithium fluoride may be used. As the fluoropolymer, those described above can be used, and for example, polyvinylidene fluoride (PVDF) or polytetrafluoroethylene (PTFE) may be used. Since PVDF absorbs light components in a wavelength band of 8 to 9 μm, the fluoropolymer may be PVDF.

The linear transmittance can be obtained by measuring the optical filter 1 using a transmission method in an FT-IR (Fourier transform infrared spectroscopy) device. The linear transmittance of the infrared transmission spectrum is converted based on the Lambert-Beer law to give a linear transmittance at a thickness of 1 mm. In addition, the wavelength bandwidth can be obtained by measuring a wavelength bandwidth where the linear transmittance is above or below a predetermined value in the target wavelength band. The wavelength bandwidth may be a wavelength bandwidth where the linear transmittance is continuously above or below a predetermined value, or a total wavelength bandwidth of wavelength bandwidths where the linear transmittance is continuously and intermittently greater than or equal to, or less than or equal to, a predetermined value. That is, in the target wavelength band, the wavelength bandwidth is a total wavelength bandwidth where the linear transmittance is above a predetermined value, or a total wavelength bandwidth where the linear transmittance is below a predetermined value. Therefore, when the linear transmittance is intermittently above or below a predetermined value, wavelength bands where the linear transmittance is above or below a predetermined value may be separated from each other in the target wavelength band. Note that the wavelength bandwidth is preferably a wavelength bandwidth where the linear transmittance is continuously above or below a predetermined value. Specifically, in the target wavelength band, a wavelength bandwidth where the linear transmittance per 1 mm thickness of the optical filter 1 is continuously 30% or more may be 50 nm or more. In the target wavelength band, a wavelength bandwidth where the linear transmittance is continuously 1% or less may be 300 nm or more.

The thickness t of the optical filter 1 is not particularly limited and can be 100 μm or more, for example. The optical filter 1 according to the present embodiment is formed using a pressure heating method as described below. Thus, the optical filter 1 can be easily obtained having a large thickness. Note that the thickness of the optical filter 1 can be 500 μm or more, 1 mm or more, or 1 cm or more. The upper limit of the thickness of the optical filter 1 is not particularly limited and can be 50 cm, for example.

As described above, the optical filter 1 includes the matrix 10 made from an inorganic substance having a water solubility of 0.4 (g/100 g-$H_2O$) or less, and the wavelength selective absorption material 20 dispersed in the matrix 10. The optical filter 1 absorbs an optical component having a wavelength of any band in the target wavelength band of 0.8 to 20 μm. When heated in air from 100° C. at a rate of 10° C. per minute, the temperature at which the mass reduction rate of the wavelength selective absorption material 20 is 10% by mass is 900° C. or less. The apparent density of the optical filter 1 relative to the true density of the matrix 10 is 70% or more. In the target wavelength band, the wavelength bandwidth where the linear transmittance per 1 mm thickness of the optical filter 1 is 30% or more is 50 nm or more. As described above, the optical filter 1 includes the matrix 10 made from an inorganic substance and thus has excellent durability.

The matrix 10 is made from an inorganic substance having a higher gas barrier property compared to resins, and the wavelength selective absorption material 20 is dispersed in the matrix 10. The relative density of the matrix 10 to the apparent density of the optical filter 1 is also high and dense. Thus, the optical filter 1 according to the present embodiment can protect the wavelength selective absorption material 20 from air or the like existing in the external space. Therefore, it may be possible to use materials having low stability to oxygen or water, which have not been usable so far, as the wavelength selective absorption material 20.

[Infrared Sensor]

Figure 3:
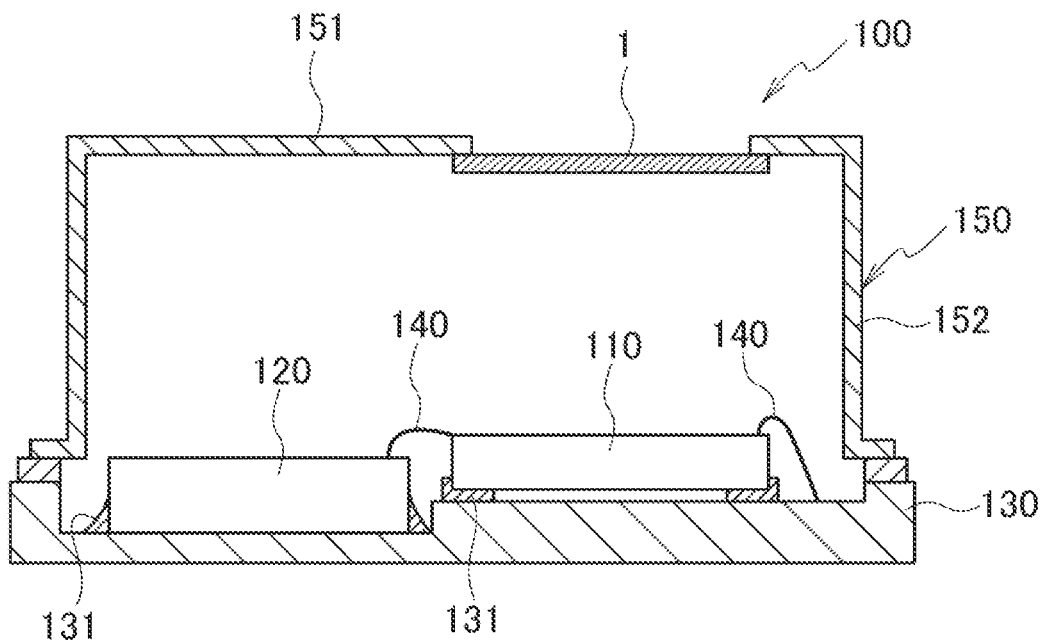
FIG. 3 is a schematic cross-sectional view illustrating an example of an infrared sensor according to the present embodiment.

Next, an infrared sensor 100 according to the present embodiment will be described with reference to FIG. 3. As illustrated in FIG. 3, the infrared sensor 100 includes the optical filter 1 described above. The infrared sensor 100 includes an infrared detection element 110, an IC element 120, a substrate 130, and a metal case 150.

The infrared detection element 110 and the IC element 120 are mounted on the substrate 130 using a die-bonding material 131. The infrared detection element 110 and the IC element 120 are electrically connected to each other by a wire 140. The infrared detection element 110 is connected to electrical circuit wiring (not illustrated) of the substrate 130 by the wire 140.

The infrared detection element 110 receives infrared rays, converts the thermal energy of the received infrared rays into electrical energy, and outputs an electrical signal corresponding to the amount of the received infrared rays to the IC element 120. The infrared detection element 110 can use a pyroelectric element, a thermal infrared detection element such as a thermopile-type infrared detection element or a bolometer-type infrared detection element, or a quantum infrared detection element.

The IC element 120 includes an amplifier circuit that amplifies the electrical signal output from the infrared detection element 110, and a determination circuit that determines the presence of a flame when the electrical signal amplified by the amplifier circuit exceeds a threshold.

The metal case 150 is attached to the substrate 130. The metal case 150 surrounds the infrared detection element 110 and the IC element 120, and the infrared detection element 110 and the IC element 120 are sealed by the substrate 130 and the metal case 150. The metal case 150 includes an upper wall 151 and a side wall 152. The upper wall 151 has an opening, and the opening is covered by the optical filter 1. The optical filter 1 is arranged to face the infrared detection element 110, and the infrared detection element 110 is provided on the substrate 130 to receive the infrared rays passing through the optical filter 1. The side wall 152 connects the edge of the upper wall 151 to the edge of the substrate 130.

Infrared rays emitted from a flame or the like pass through the optical filter 1 and are received by the infrared detection element 110. The infrared detection element 110 outputs an electrical signal corresponding to the amount of received infrared rays to the IC element 120. The IC element 120 determines whether a flame exists in response to the electric signal. In this way, the infrared sensor 100 can detect a flame using infrared rays emitted from the flame.

Note that although an example of using the infrared sensor 100 as a flame sensor for detecting a flame has been described in the present embodiment, the application of the infrared sensor 100 is not limited to such a form. The infrared sensor 100 can also be used for a human sensor, a biosensor, a crime prevention sensor, a gas sensor, a non-contact thermometer, a solid-state imaging device, a camera module, and the like.

[Light Emitting Device]

Figure 4:
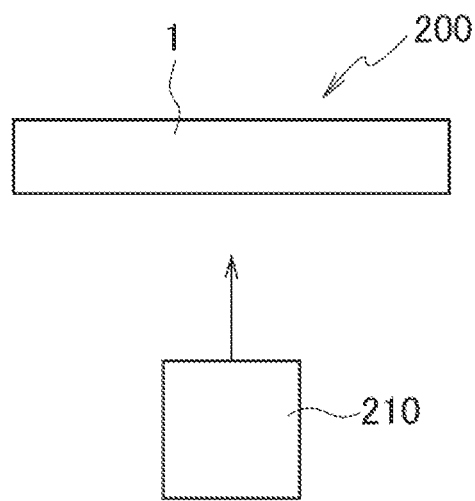
FIG. 4 is a schematic diagram illustrating an example of a light emitting device according to the present embodiment.

Next, a light emitting device 200 according to the present embodiment will be described with reference to FIG. 4. The light emitting device 200 includes the optical filter 1 described above, as illustrated in FIG. 4. Also, the light emitting device 200 includes a light source 210 that irradiates the optical filter 1 with light containing infrared rays. The light source 210 may include an LED, a xenon lamp, a laser diode, and a combination thereof.

Since the light emitting device 200 includes the optical filter 1, part of infrared rays emitted from the light source 210 can be cut by the optical filter 1. Thus, the light emitting device 200 according to the present embodiment can emit light having a specific wavelength. The light emitting device 200 can be used for, for example, a light emitting device for inspection, a light emitting device for a surveillance camera, a light emitting device for hair removal, a light emitting device for curing an infrared curable resin, and the like.

[Manufacturing Method for Optical Filter]

Next, a method for manufacturing the optical filter 1 according to the present embodiment will be described. The optical filter 1 can be manufactured by heating a mixture of inorganic particles and a wavelength selective absorption material under pressure in a state containing a solvent. By using such a pressure heating method, part of the inorganic substance are eluted and particles of the inorganic substance are bound to each other, and thus the optical filter 1 can be formed including the wavelength selective absorption material 20 dispersed therein.

Specifically, a mixed powder is prepared by mixing a powder of an inorganic substance with a powder of a wavelength selective absorption material. The method for mixing the inorganic substance powder with the wavelength selective absorption material powder is not particularly limited and can be performed in a dry or wet process. The inorganic substance powder and the wavelength selective absorption material powder may be mixed in air or under an inert atmosphere. In the preparation method for the mixture, the wavelength selective absorption material is first mixed with a solvent. The wavelength selective absorption material may or may not be dissolved in the solvent. Then, by adding the inorganic substance powder to the mixture of the wavelength selective absorption material and the solvent, a mixture containing the inorganic substance, the wavelength selective absorption material, and the solvent may be prepared.

Next, the solvent is added to the mixed powder. The solvent is not particularly limited, and a solvent capable of dissolving part of the inorganic substance when the mixed powder is pressurized and heated can be used, for example. Also as the solvent, a solvent capable of reacting with an inorganic substance to form another inorganic substance different from said inorganic substance can be used. As such a solvent, at least one selected from the group consisting of an acidic aqueous solution, an alkaline aqueous solution, water, an alcohol, a ketone, and an ester can be used. As the acidic aqueous solution, an aqueous solution having a pH of 1 to 3 can be used. As the alkaline aqueous solution, an aqueous solution having a pH of 10 to 14 can be used. As the acidic aqueous solution, an aqueous solution of an organic acid is preferably used. As the alcohol, an alcohol having 1 to 12 carbon atoms is preferably used.

Then, the mixture containing the inorganic substance, the wavelength selective absorption material, and the solvent is filled inside a die. After the die is filled with the mixture, the die may be heated as necessary. Then, by applying pressure to the mixture inside the die, the inside of the die enters a high pressure state. At this time, the inorganic substance and the wavelength selective absorption material become denser, and at the same time, particles of the inorganic substance are bound to each other.

When a solvent that dissolves part of the inorganic substance is used, an inorganic compound making up the inorganic substance is dissolved in the solvent under high pressure. The dissolved inorganic compound penetrates into gaps between the inorganic substance and the wavelength selective absorption material, gaps within the inorganic substance, and gaps within the wavelength selective absorption material. Then, the solvent in the mixture is removed in this state to form a connection part derived from the inorganic substance, between the inorganic substance and the wavelength selective absorption material, within the inorganic substance, and within the wavelength selective absorption material. When a solvent that reacts with an inorganic substance to form another inorganic material different from said inorganic substance is used as the solvent, an inorganic compound making up the inorganic substance reacts with the solvent under high pressure. Then, the other inorganic substance generated through the reaction is filled in gaps between the inorganic substance and the wavelength selective absorption material, gaps within the inorganic substance, and gaps within the wavelength selective absorption material to form a connection part derived from the other inorganic substance.

When a solvent that dissolves part of the inorganic substance is used, heating and pressurizing conditions of the mixture containing the inorganic substance, the wavelength selective absorption material, and the solvent are not particularly limited as long as the conditions are such that the dissolution of the surface of the inorganic substance progresses. When a solvent that reacts with an inorganic substance to form another inorganic substance different from said inorganic substance is used, heating and pressurizing conditions for the mixture are not particularly limited as long as the reaction between the inorganic substance and the solvent progresses. For example, it is preferable that the mixture containing the inorganic substance, the wavelength selective absorption material, and the solvent be heated to 50 to 300° C. and then be pressurized at a pressure of 10 to 600 MPa. Note that the temperature at which the mixture containing the inorganic substance, the wavelength selective absorption material, and the solvent is heated is more preferably 80 to 250° C., still more preferably 100 to 200° C. The pressure at which the mixture containing the inorganic substance, the wavelength selective absorption material, and the solvent is pressurized is more preferably 50 to 600 MPa.

Then, the optical filter 1 can be obtained by taking out the molded body from the inside of the die. Note that the connection part derived from the inorganic substance and formed between the inorganic substance and the wavelength selective absorption material, within the inorganic substance, and within the wavelength selective absorption material is preferably the binding part 12 described above.

Here, a sintering method has been known as a method for manufacturing an inorganic member made from ceramic. The sintering method is a method for obtaining a sintered body by heating an aggregate of a solid powder made from an inorganic substance at a temperature lower than the melting point. However, in the sintering method, the solid powder is heated to 1000° C. or more, for example. Thus, when the sintering method is used to obtain a composite member made from an inorganic substance and a wavelength selective absorption material, it is not possible to obtain the composite member because the wavelength selective absorption material is carbonized due to heating at a high temperature. However, in the method for manufacturing the optical filter 1 according to the present embodiment, a mixture made by mixing an inorganic substance powder and a wavelength selective absorption material powder is heated at a low temperature of 300° C. or less, and thus carbonization of the wavelength selective absorption material is unlikely to occur. Therefore, the wavelength selective absorption material 20 can be stably dispersed inside the matrix 10 made from the inorganic substance.

Furthermore, in the manufacturing method according to the present embodiment, since a mixture made by mixing an inorganic substance powder with a wavelength selective absorption material powder is pressurized while being heated, the inorganic substance aggregates to form the matrix 10, which is dense. Consequently, the number of pores inside the matrix 10 decreases, and thus the optical filter 1 can be obtained having high strength while oxidative deterioration of the wavelength selective absorption material 20 is suppressed.

Thus, the method for manufacturing the optical filter 1 includes a step of mixing a powder of an inorganic substance with a powder of a wavelength selective absorption material to obtain a mixture, and a step of adding to the mixture a solvent that dissolves the inorganic substance or a solvent that reacts with the inorganic substance and then pressurizing and heating the mixture. Alternatively, the method for manufacturing the optical filter 1 includes a step of mixing a wavelength selective absorption material with a solvent that dissolves the inorganic substance or a solvent that reacts with the inorganic substance, a step of obtaining a mixture by mixing a powder of an inorganic substance with the solvent containing the wavelength selective absorption material, and a step of pressurizing and heating the mixture. Heating and pressurizing conditions for the mixture are preferably a temperature of 50 to 300° C. and a pressure of 10 to 600 MPa. In the manufacturing method according to the present embodiment, since the optical filter 1 is formed under such a low temperature condition, carbonization of the wavelength selective absorption material 20 can be suppressed, and a colored ceramic member can be obtained. Note that in the above method, a solvent that dissolves the inorganic substance or a solvent that reacts with the inorganic substance is added to the mixture. However, in the optical filter 1 according to the present embodiment, a solvent that dissolves the inorganic substance or a solvent that reacts with the inorganic substance may not be added to the mixture. That is, a mixture obtained by mixing the inorganic substance powder with the wavelength selective absorption material powder may be pressurized and heated to obtain the optical filter 1. For example, when lithium fluoride is used as the inorganic substance, it plastically deforms at high temperatures, and thus the optical filter 1 can be manufactured being dense through pressurization above the temperature at which it plastically deforms.

EXAMPLES

The present embodiment will be described in more detail below with an example and a reference example, but the present embodiment is not limited to these examples.

Preparation of Test Samples

Example 1

First, as inorganic particles, a lithium fluoride powder (FUJIFILM Wako Pure Chemical Corporation, special grade reagent) having a water solubility of 0.134 g/100 mL and an average particle size of 5 μm was prepared. As a wavelength selective absorption material, a melamine powder (FUJIFILM Wako Pure Chemical Corporation, special grade reagent) was prepared. Then, a mixed powder was obtained by mixing the lithium fluoride powder and the melamine powder with acetone using an agate mortar and an agate pestle so that the mass ratio was 99:1 (volume ratio 98.3:1.7).

Next, the mixed powder was put in a cylindrical die (Φ 10) for molding having an internal space. The mixed powder was then heated and pressurized under conditions of 180° C., 400 MPa, and 30 minutes. Thus, a cylindrical test sample according to the present example was obtained.

Reference Example 1

A test sample was prepared in the same manner as in example 1 except that no wavelength selective absorption material was added. That is, the lithium fluoride powder used in example 1 was heated and pressurized as in example 1.

[Evaluation]
(Linear Transmittance)

Figure 5:
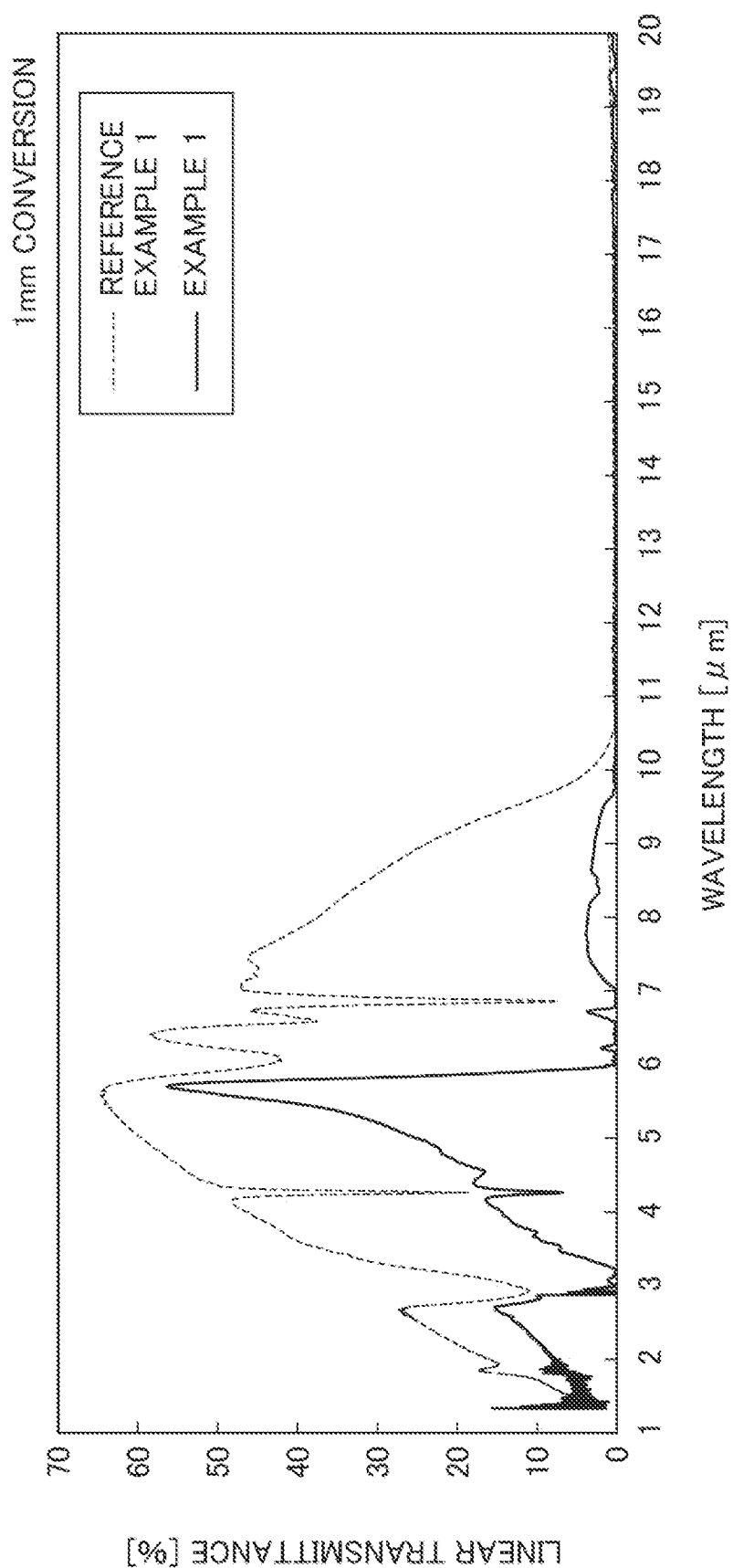
FIG. 5 illustrates infrared spectra of test samples according to example 1 and reference example 1 measured using a transmission method.

First, test samples thus obtained were measured using a transmission method with an FT-IR device, and infrared transmission spectra illustrated in FIG. 5 were obtained. Note that the linear transmittance of the infrared transmission spectra was converted based on the Lambert-Beer law so that it was a linear transmittance at a thickness of 1 mm.

As illustrated in FIG. 5, the test sample according to example 1 exhibits decreased linear transmittance in several bands compared with the test sample according to reference example 1, and this indicates that infrared rays having a specific wavelength are absorbed by the wavelength selective absorption material. From this, it can be seen that the wavelength selective absorption material remains in the test sample without decomposition.

From the infrared spectra illustrated in FIG. 5, the maximum transmittance of the test sample according to example 1 was found to be 56% at a wavelength of 5.71 µm. The band in which the linear transmittance was ½ (28%) of the maximum transmittance was 5.13 to 5.84 µm, and the full width at half maximum was 705 nm.

The band in which the linear transmittance was 30% or more was in the range of 5.21 to 5.83 µm, and the bandwidth was 621 nm. In the range of at least 9.60 to 10.00 µm, the linear transmittance was continuously about 0.4%, and this wavelength bandwidth was 400 nm. In the range of at least 6.00 to 7.00 µm, the linear transmittance was intermittently about 0.6%. These results suggest that the test sample according to example 1 is useful as an optical filter.

(TG (Thermogravimetry))

The mass reduction rate of melamine was measured by performing TG. Note that 7.1 mg of the sample was put in an aluminum container, air was introduced at 50 mL/min, and the measurement was performed from 100 to 560° C. at a heating rate of 10° C./min. The TG curve obtained by the measurement is illustrated in FIG. 6.

Figure 6:
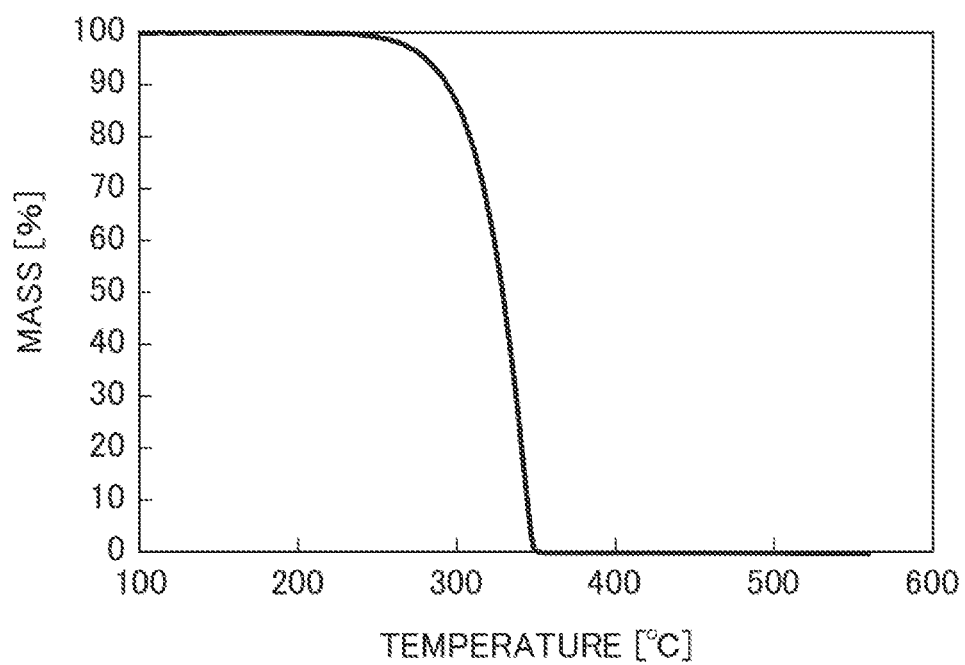
FIG. 6 is a TG curve of melamine.

As illustrated in FIG. 6, mass reduction of melamine began around 240° C. with a mass reduction rate of 5% at 279° C. and a mass reduction rate of 10% at 292° C. This result shows that when melamine is heated from 100° C. at a rate of 10° C./min in air, the temperature at which the mass reduction rate reaches 10% is 300° C. or less. It can be seen that in the present example, the mixed powder is heated and pressurized under conditions of 180° C., 400 MPa, and 30 minutes, and thus even a material having low heat resistance, such as melamine, can be dispersed in an inorganic matrix.

(Relative Density)

Relative densities of test samples according to example 1 and reference example 1 were measured. Specifically, the volume and mass of the test samples were measured to calculate apparent densities of the test samples. The relative densities of the test sample were then calculated by dividing the apparent densities of the test samples by the true density of lithium fluoride, which is the matrix.

As a result of calculating the relative densities as described above, the relative density of the test sample according to example 1 was 89% and that of the test sample according to reference example 1 was 90°/%. That is, it is estimated that the porosity of the test sample according to example 1 was 11% and that of the test sample according to reference example 1 was 10%. From these results, it can be understood that the porosities of the test samples are small and the test samples have dense structures.

Next, test samples according to examples 2 to 7 and reference example 2 were prepared and evaluated.

Preparation of Test Samples

Example 2

First, as inorganic particles, a lithium fluoride powder having a water solubility of 0.134 g/100 mL and an average particle size of 1 µm was prepared. As a wavelength selective absorption material, PVDF was prepared. Then, a mixed powder was obtained by mixing the lithium fluoride powder and a PVDF powder with acetone using an agate mortar and an agate pestle so that the mass ratio was 99:1 (volume ratio 98.5:1.5).

Note that the lithium fluoride powder was manufactured as follows. First, 8.9 g of LiCl (FUJIFILM Wako Pure Chemical Corporation, Wako special grade) was dissolved in 35 mL of ion-exchanged water to prepare an LiCl solution. Also, 12.2 g of KF (FUJIFILM Wako Pure Chemical Corporation, special grade reagent) was dissolved in 35 ml of ion-exchanged water to prepare a KF solution. Then, the total amount of the LiCl solution and the total amount of the KF solution were mixed at room temperature and stirred using a magnetic stirrer for three minutes. This stirred solution was subjected to suction filtration using a membrane filter having a pore size of 0.1 µm, and the residue was dried to obtain a lithium fluoride powder.

PVDF used was manufactured by Sigma-Aldrich (average Mw approximately 534,000 by GPC, powder). The average particle size of the PVDF is about 200 nm. Note that since the refractive index of lithium fluoride is 1.39 and that of PVDF is 1.42, the difference in refractive indices between lithium fluoride and PVDF is 0.03.

Next, the mixed powder was put in a cylindrical die (Φ 12) for molding having an internal space. The mixed powder was then heated and pressurized under conditions of 200° C., 400 MPa, and 10 minutes. Thus, a cylindrical test sample according to the present example was obtained. Note that the thickness of the test sample was 1,053 µm.

Example 3

A test sample was prepared in the same manner as in example 2 except that the mass ratio of the lithium fluoride powder to the PVDF powder in the mixed powder was 98:2 (volume ratio 97.1:2.9). Note that the thickness of the test sample was 1,057 µm.

Example 4

A test sample was prepared in the same manner as in example 2 except that the mass ratio of the lithium fluoride powder to the PVDF powder in the mixed powder was 97:3 (volume ratio 95.6:4.4). Note that the thickness of the test sample was 1,017 µm.

Example 5

A test sample was prepared in the same manner as in example 2 except that the mass ratio of the lithium fluoride powder to the PVDF powder in the mixed powder was 96:4 (volume ratio 94.2:5.8). Note that the thickness of the test sample was 1,014 µm.

Example 6

A test sample was prepared in the same manner as in example 2 except that the mass ratio of the lithium fluoride powder to the PVDF powder in the mixed powder was 92:8 (volume ratio 88.6:11.4). Note that the thickness of the test sample was 1,064 μm.

Example 7

A test sample was prepared in the same manner as in example 2 except that instead of the PVDF powder, a PTFE powder (KITAMURA LIMITED, KTL-1N) was used. Specifically, the mass ratio of the lithium fluoride powder to the PTFE powder in the mixed powder was set to 99:1 (volume ratio 98.4:1.6). Note that the thickness of the test sample was 1,147 μm.

Reference Example 2

A test sample was prepared in the same manner as in example 2 except that the mass ratio of the lithium fluoride powder to the PVDF powder in the mixed powder was 100:0.

Note that the thickness of the test sample was 1,064 μm.
[Evaluation]
(Linear Transmittance)

The test samples thus obtained were measured using a transmission method with an FT-IR device, and infrared transmission spectra illustrated in FIGS. 7 to 10 were obtained. Note that the linear transmittance of the infrared transmission spectra was converted based on the Lambert-Beer law so that it was a linear transmittance at a thickness of 1 mm.

As illustrated in FIGS. 7 to 10, the test samples according to examples 2 to 7 exhibit decreased linear transmittance in several bands compared with the test sample according to reference example 2, and this indicates that infrared rays having a specific wavelength are absorbed by the wavelength selective absorption material. From this, it can be seen that the wavelength selective absorption material remains in the test samples without decomposition.

Figure 7:
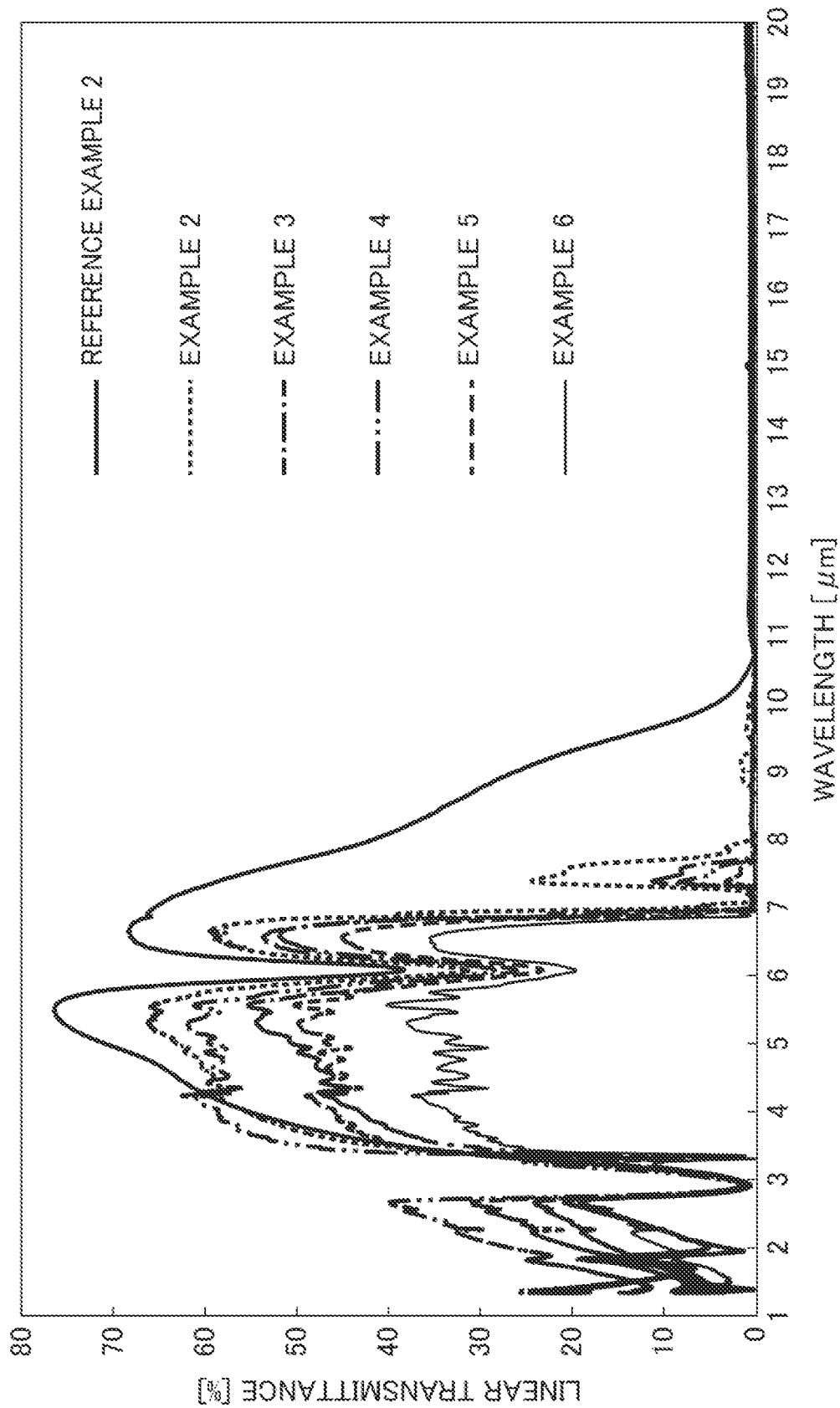
FIG. 7 illustrates infrared spectra of test samples according to examples 2 to 6 and reference example 2 measured using the transmission method.
Figure 8:
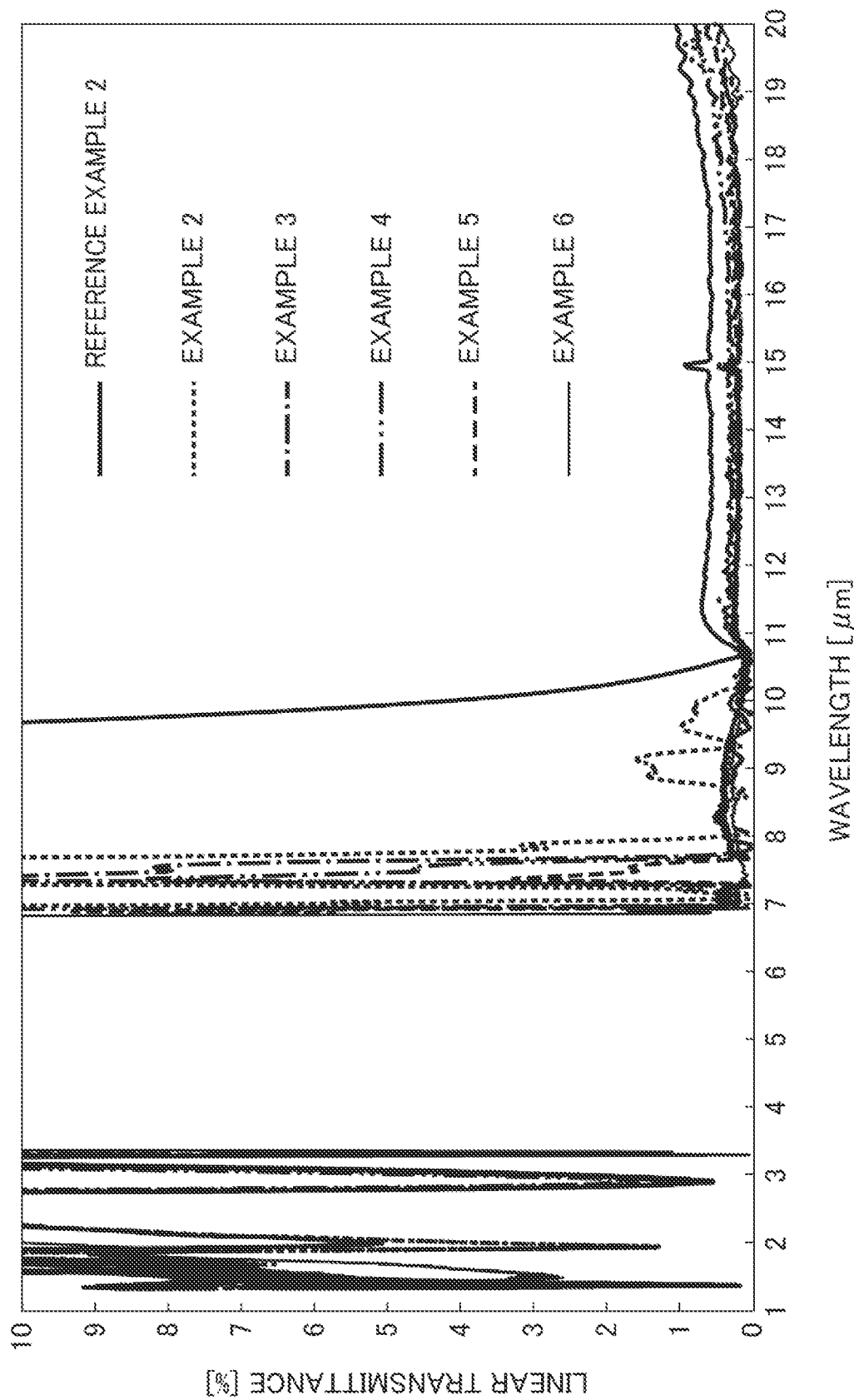
FIG. 8 illustrates infrared spectra in which part of FIG. 7 is enlarged.
Figure 9:
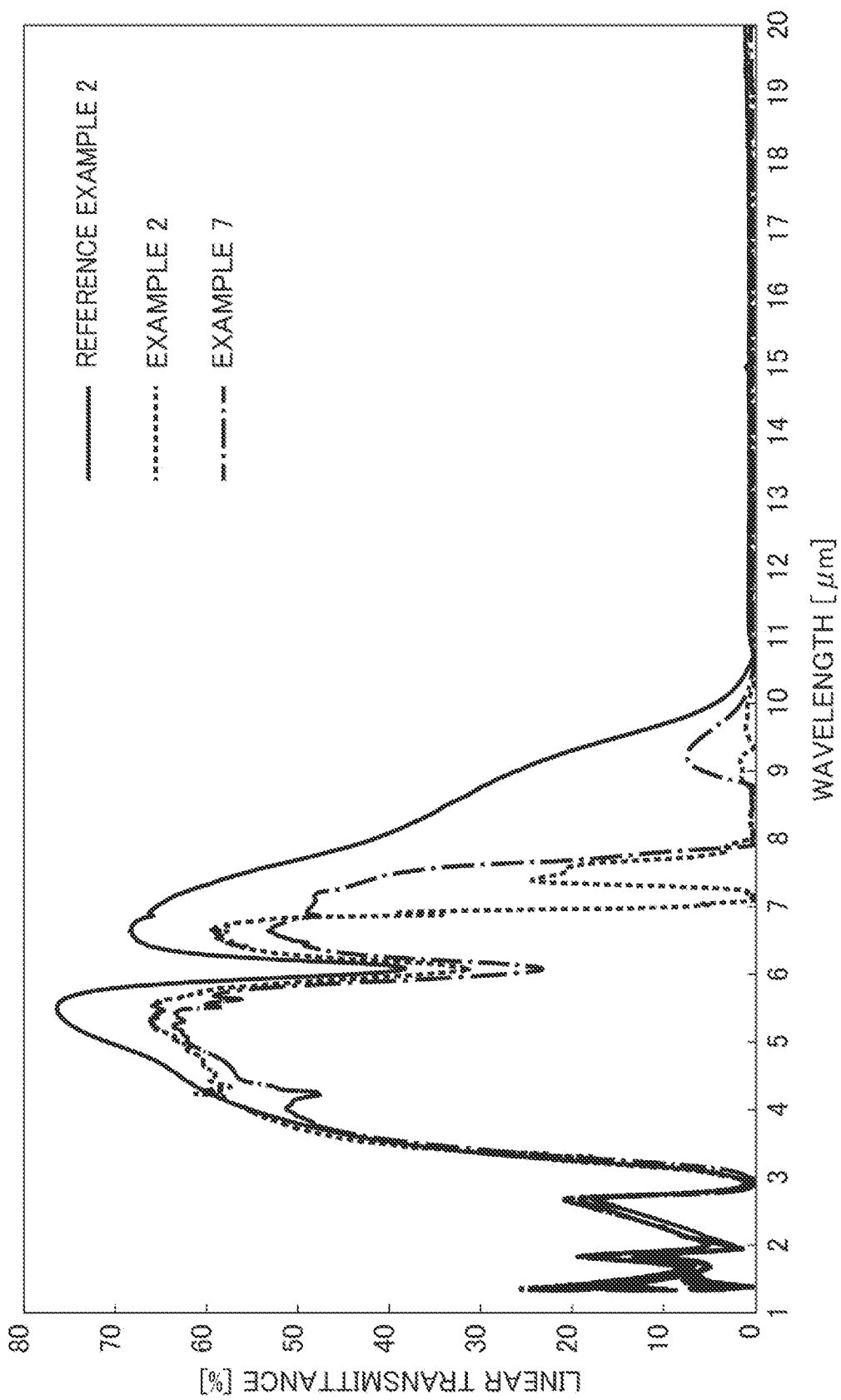
FIG. 9 illustrates infrared spectra of test samples according to example 2, example 7, and reference example 2 measured using the transmission method.
Figure 10:
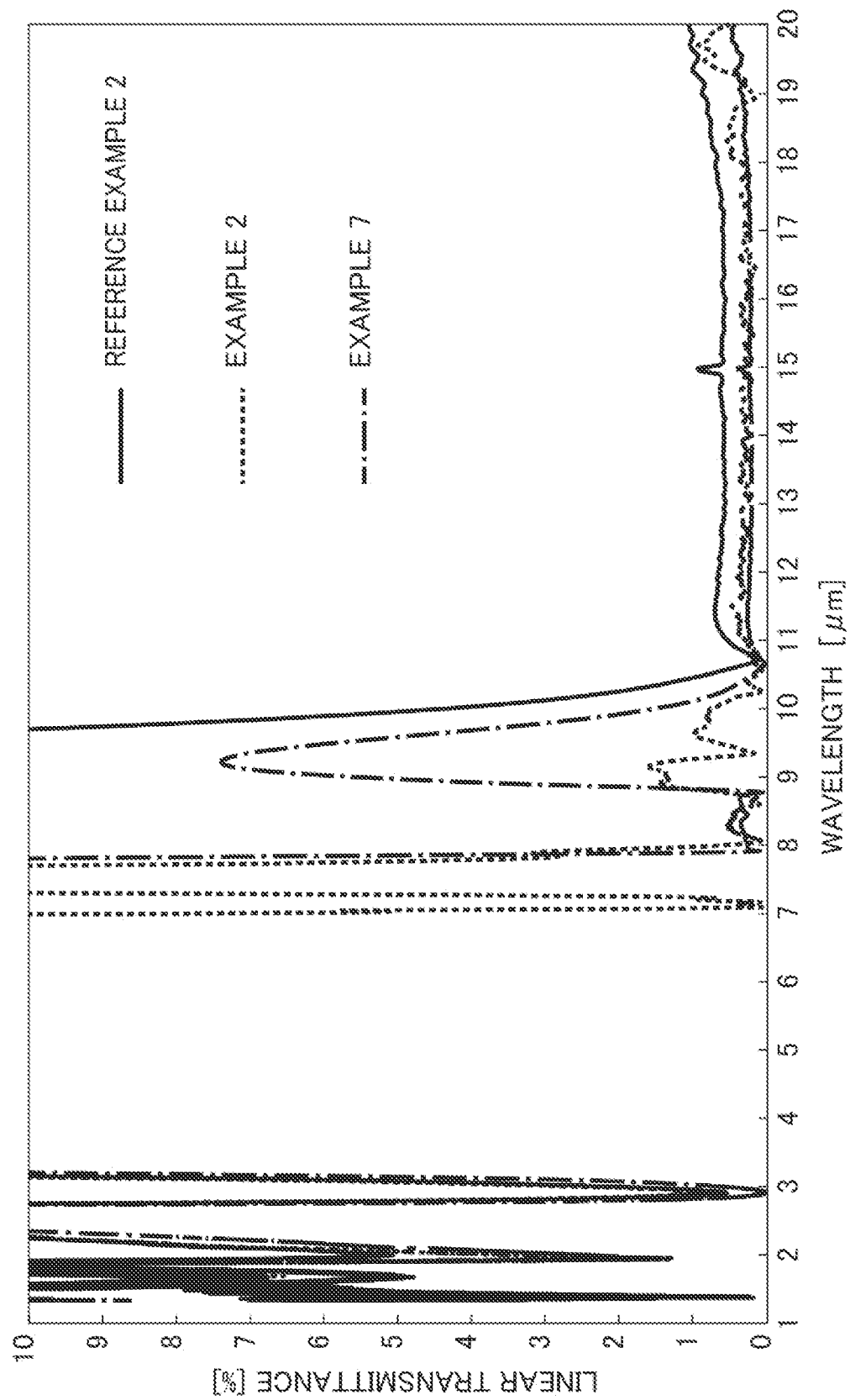
FIG. 10 illustrates infrared spectra in which part of FIG. 9 is enlarged.

As illustrated in FIGS. 7 and 8, in the test samples according to examples 2 to 7, the wavelength bandwidth where the linear transmittance per 1 mm thickness of the test sample was 30% or more was 50 nm or more in the target wavelength band of 0.8 to 20 μm. These results suggest that the test samples according to examples 2 to 7 are useful as optical filters.

Furthermore, in the test samples according to examples 2 to 7, the linear transmittance was 10% or less over the entire wavelength band of 8 to 20 μm. It was found that the more fluoropolymer added, the smaller the linear transmittance. Also, it was found that when PVDF was used as the fluoropolymer, the linear transmittance in a wavelength band of 7 to 8 μm could be decreased compared with that when PTFE was used in the same amount. These results suggest that the test samples according to examples 2 to 7 are useful as filters to cut wavelengths in the long wavelength band.

Figure 11:
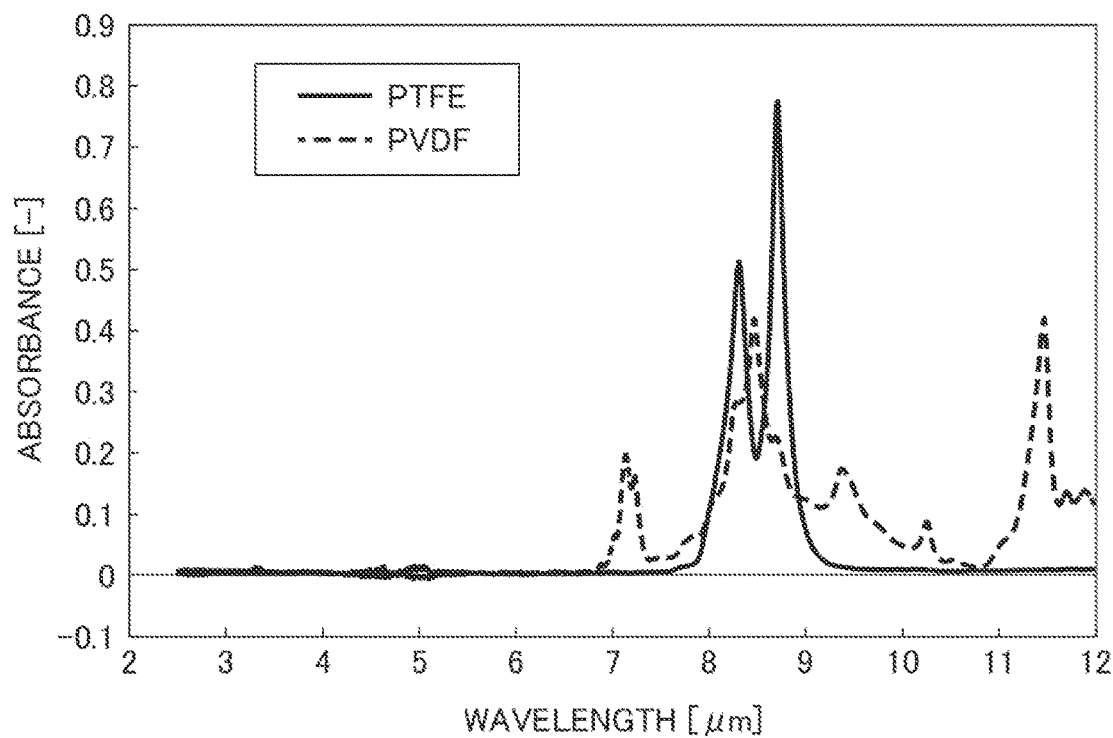
FIG. 11 illustrates infrared spectra of a PTFE powder and a PVDF powder measured using an ATR method.

The PTFE powder and PVDF powder used in the examples were measured using an ATR method with an FT-IR device, and absorption spectra as illustrated in FIG. 11 were confirmed. It was confirmed that PTFE had an absorption peak at wavelengths of 8 to 9 μm. Also, it was confirmed that in addition to wavelengths of 8 to 9 μm, PVDF had multiple absorption peaks before and after the wavelengths of 8 to 9 μm. These results suggest that part of the light transmitted through the matrix was absorbed by the fluoropolymer, resulting in a smaller linear transmittance in the entire wavelength band of 8 to 20 μm.
(TG (Thermogravimetry))

Figure 12:
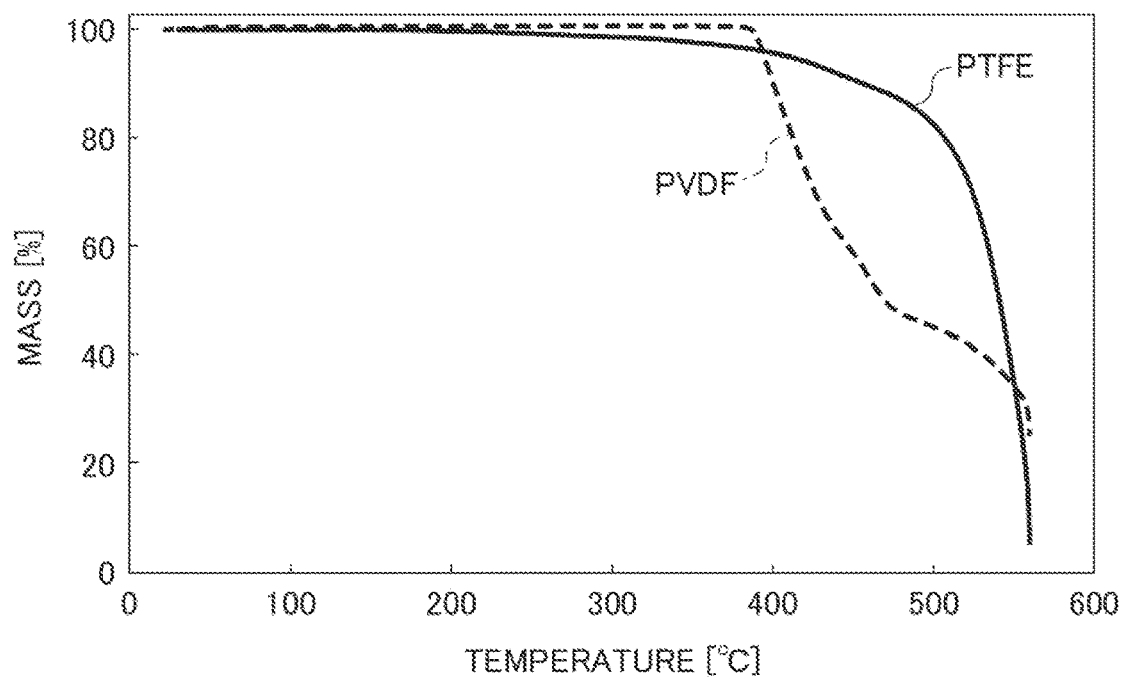
FIG. 12 illustrates TG curves of PTFE and PVDF

The mass reduction rate of PTFE and PVDF was measured by performing TG. Note that samples having 5.5 mg of PTFE or 6.2 mg of PVDF were put in an aluminum container, air was introduced at 50 mL/min, and the measurement was performed from 30 to 600° C. at a heating rate of 10° C./min. The TG curves obtained by the measurement are illustrated in FIG. 12. As a result, the temperature at which the mass reduction rate of PTFE was 10% by mass was 456° C., and the temperature at which the mass reduction rate of PVDF was 10% by mass was 400° C.
(Relative Density)

The relative densities of test samples according to examples 2 to 7 and reference example 2 were measured as above. As a result, the relative densities of all test samples were 90% or more. From this result, it can be understood that the porosities of test samples are small and the test samples have dense structures.

The entire contents of Japanese Patent Application No. 2021-025009 (filed Feb. 19, 2021) are incorporated herein by reference.

Although the present embodiment has been described above, the present embodiment is not limited to these descriptions, and various modifications are possible within the scope of the gist according to the present invention.

INDUSTRIAL APPLICABILITY

The present disclosure makes it possible to provide an optical filter, an infrared sensor, and a light emitting device that have a matrix including an inorganic material and have excellent durability.

REFERENCE SIGNS LIST

1 Optical filter
10 Matrix
20 Wavelength selective absorption material
100 Infrared sensor
200 Light emitting device

The invention claimed is:

1. An optical filter, comprising:
a matrix including an inorganic substance having a water solubility of 0.4 g/100 g-$H_2O$ or less; and
a wavelength selective absorption material dispersed in the matrix, wherein
the optical filter absorbs an optical component having a wavelength of any band in a target wavelength band of 0.8 to 20 μm,
a temperature at which a mass reduction rate of the wavelength selective absorption material is 10% by mass when heated in air from 100° C. at a rate of 10° C./min is 900° C. or less,
an apparent density of the optical filter relative to a true density of the matrix is 70% or more, and
in the target wavelength band, a wavelength bandwidth where a linear transmittance per 1 mm thickness of the optical filter is 30% or more is 50 nm or more.

2. The optical filter according to claim 1, wherein a temperature at which the mass reduction rate is 10% by mass is 600° C. or less.

3. The optical filter according to claim 1, wherein a temperature at which the mass reduction rate is 10% by mass is 300° C. or less.

4. The optical filter according to claim 1, wherein the inorganic substance included in the matrix contains at least one selected from the group consisting of a fluoride, an oxide, and an oxidized hydroxide.

5. The optical filter according to claim 1, wherein in a target wavelength band of 3 to 10 μm, a wavelength bandwidth where the linear transmittance is 30% or more is 300 nm or more.

6. The optical filter according to claim 1, wherein in a target wavelength band of 3 to 10 μm, a wavelength bandwidth where the linear transmittance is 1% or less is 300 nm or more.

7. The optical filter according to claim 1, wherein in a target wavelength band of 3 to 10 μm, a wavelength bandwidth where the linear transmittance is 30% or more is 300 nm or more and a wavelength bandwidth where the linear transmittance is 1% or less is 300 nm or more.

8. The optical filter according to claim 1, wherein the inorganic substance contains lithium fluoride.

9. The optical filter according to claim 1, wherein the inorganic substance contains a fluoride, and the wavelength selective absorption material contains a fluoropolymer.

10. The optical filter according to claim 1, wherein the linear transmittance is 10% or less over an entire wavelength band of 8 to 20 μm.

11. An infrared sensor, comprising the optical filter according to claim 1.

12. A light emitting device, comprising the optical filter according to claim 1.

* * * * *